UNITED STATES PATENT OFFICE.

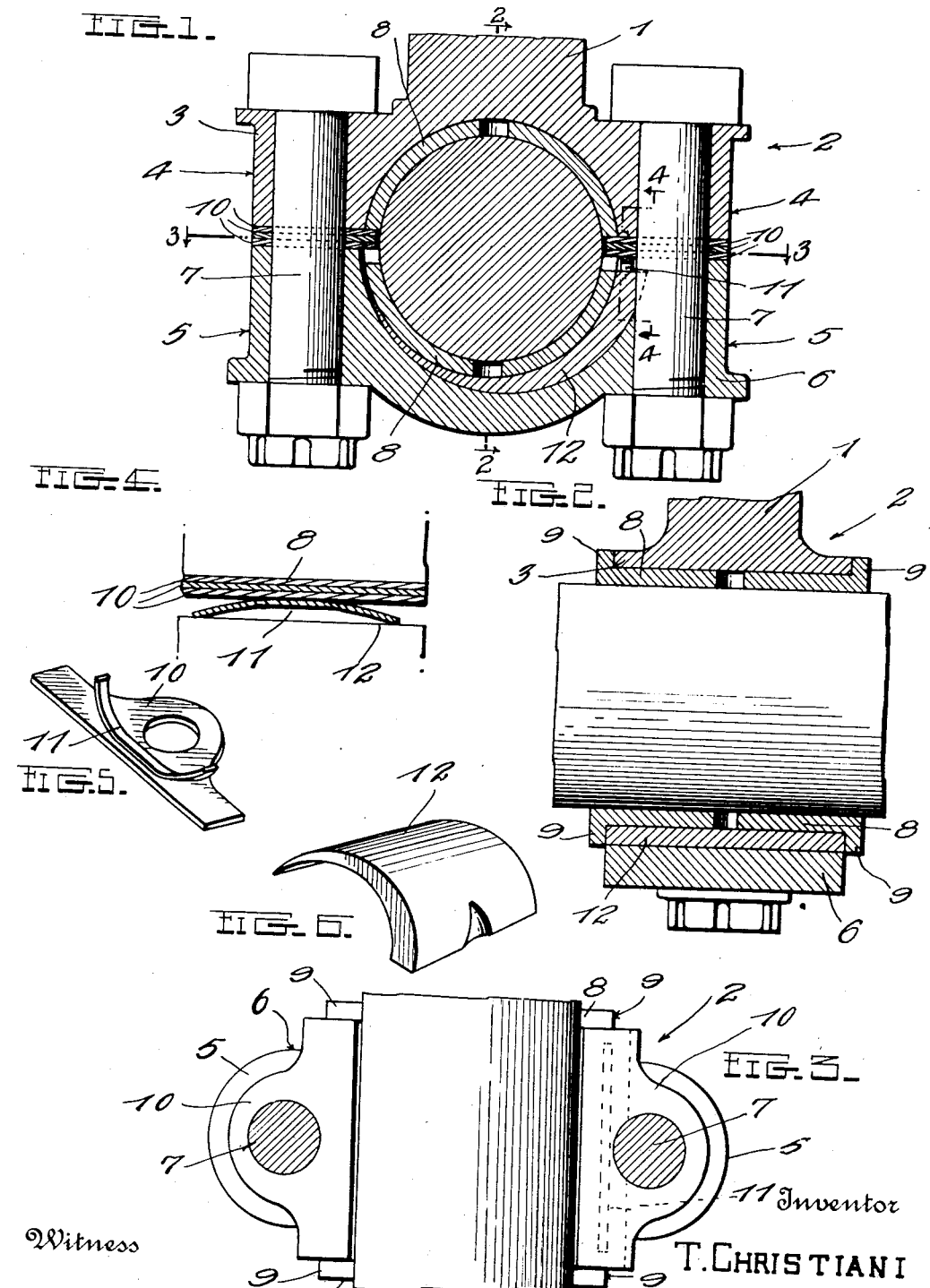

THOMAS CHRISTIANI, OF SARLES, NORTH DAKOTA.

AUTOMATICALLY-ADJUSTABLE BEARING.

1,347,443.  Specification of Letters Patent.  Patented July 20, 1920.

Application filed April 3, 1919. Serial No. 287,208.

*To all whom it may concern:*

Be it known that I, THOMAS CHRISTIANI, a citizen of the United States, residing at Sarles, in the county of Cavalier and State of North Dakota, have invented certain new and useful Improvements in Automatically-Adjustable Bearings; and I do declare the following to be a full, clear, and exact description of the invention, such as will enable others skilled in the art to which it appertains to make and use the same.

This invention relates to improvements in automatically adjustable bearings and has for its primary object the provision of a durable and highly efficient device of this character.

Another object is to provide a device of this character in which the parts effecting automatic adjustment are properly housed and at the same time so located as to be readily accessible for repair, etc.

With these and numerous other objects in view my invention resides in certain novel features of construction and in unique combinations of parts to be hereinafter fully described and claimed, the descriptive matter being supplemented by the accompanying drawings wherein:

Figure 1 is a vertical transverse sectional view of the bearing and shaft;

Fig. 2 is a vertical longitudinal sectional view of the bearing taken on line 2—2 of Fig. 1;

Fig. 3 is a horizontal sectional view thereof taken on line 3—3 of Fig. 1;

Fig. 4 is a detail sectional view of the shims and spring secured thereto;

Fig. 5 is a detail perspective of the spring secured to one of the shims and,

Fig. 6 is a perspective view of the wedge.

In these drawings which constitute a part of the application, and in which similar reference characters designate corresponding parts throughout the several views, the numeral 1 indicates a portion of a connecting rod of ordinary structure, a bearing 2 on one end of the rod, said bearing including two half sections, one section 3 being formed integral with the rod and provided with a pair of lugs or ears 4 having bolt openings alined with similarly formed openings in lugs or ears 5 on the other half section 6, said sections being held together by the bolts 7 as illustrated in Fig. 1 of the drawings.

Disposed in the shaft opening is the bushing 8 formed in two half sections, each being provided at its opposite edges with outwardly directed circumferential flanges 9 adapted to contact the outer edges of the bearing sections and prevent relative movement of the bushing and bearing sections. Ordinary shims 10 are disposed between the bearing sections for the purpose of filling in spaces, one of said shims carrying on its lower face a substantially U shaped spring 11, whose functions will be hereinafter fully set forth.

For the purpose of automatically taking up wear in the bushings, a wedge member 12, curved to conform with the shape of the wall of the shaft opening, is disposed between the lower half-section of the bushing and the adjacent bearing section. The wedge member is retained in its proper position by means of the flanges 9 on the bushing halves and is disposed so that the U-shaped spring 11 exerts a steady tension on the thick end thereof, moving the wedge circumferentially taking up wear as soon as it takes place in the bushing.

It is readily seen that the wedge member being positioned between the flanges 9 as set forth, is protected against the weather so that it is always in working order and at the same time easily accessible for lubrication, etc.

In the drawings, certain specific details of construction have been shown for accomplishing probably the best results, and in the preceding such details have been described, but it is obvious that I need not be restricted thereto otherwise than to the extent claimed.

I claim—

1. A bearing including two halves having a shaft opening there between and bolt means connecting the halves, shims disposed between said halves, wear take up means including a wedge member in said opening conforming substantially with the shape of the wall thereof and spring means carried by one of the shims for moving said wedge member in a circumferential direction to take up wear.

2. A bearing including two halves having a shaft opening there between and bolt means connecting the halves, shims disposed between said halves, wear take-up means including a wedge member in said opening conforming substantially with the shape of the wall thereof and a substantially U shaped spring secured at its center to one of the shims and adapted to move said wedge member in a circumferential direction to take up wear.

3. A bearing including two halves having a shaft opening there between and bolt means connecting the halves, two bushing halves in said shaft opening, circumferential flanges extending outwardly from the sides of the bushing halves, wear take-up means including a curved wedge member disposed between one of the bushing halves and the adjacent bearing half and between said flanges and spring means for moving the wedge circumferentially to take up wear.

4. A bearing including two halves having a shaft opening there between and bolt means connecting the halves, two bushing halves in said shaft opening, wear take up means including a curved wedge member disposed between one of the bushing halves and the adjacent bearing half and spring means for moving the wedge circumferentially to take up wear.

In testimony whereof I have hereunto set my hand.

THOMAS CHRISTIANI.

Witnesses:
O. P. GAYMORE,
S. M. MOWRY.